April 26, 1960 A. J. RACK 2,934,657

TRANSISTOR TRIGGER NETWORK

Filed March 5, 1949 4 Sheets-Sheet 1

INVENTOR
A. J. RACK
BY Harry C. Hart
ATTORNEY

INVENTOR
A. J. RACK
BY Harry C. Hart
ATTORNEY

April 26, 1960 A. J. RACK 2,934,657

TRANSISTOR TRIGGER NETWORK

Filed March 5, 1949 4 Sheets-Sheet 3

INVENTOR
A. J. RACK
BY Harry C. Hart
ATTORNEY

INVENTOR
A. J. RACK
BY Harry C. Hart
ATTORNEY

United States Patent Office 2,934,657

Patented Apr. 26, 1960

2,934,657

TRANSISTOR TRIGGER NETWORK

Alois J. Rack, Millington, N.J., assignor to Bell Telephone Laboratories, Incorporated, New York, N.Y., a corporation of New York Application March 5, 1949, Serial No. 79,861

14 Claims. (Cl. 307—88.5)

This invention relates to signal translation networks utilizing semiconductor amplifiers as active elements.

A principal object of the invention is to generate waves having pronounced discontinuities.

A related object is to generate waves of substantially rectangular wave form.

Another related object is to generate waves of substantially triangular wave form.

A more general object is to provide a network element having one or more unstable conditions and having in some instances one or more neighboring stable conditions such that it may be employed in a network as a "trigger" element, performing as a relaxation oscillator, a multivibrator, a "single trip" trigger circuit, or a double-stability or "flip-flop" circuit as required, in dependence on the appropriate adjustment of the various external circuit parameters.

Application Serial No. 11,165 of John Bardeen and W. H. Brattain, filed February 26, 1948 describes and claims an amplifier unit of novel construction, comprising a small block of semiconductor material, such as N-type germanium, with which are associated three electrodes. One of these, known as the base electrode, makes low resistance contact with a face of the block. It may be a plated metal film. The others, termed emitter and collector, respectively, preferably make rectifier contact with the block. They may, in fact, be point contacts. The emitter is biased to conduct in the forward direction and the collector is biased to conduct in the reverse direction. "Forward" and "reverse" are here used in the sense in which they are understood in the rectifier art. When a signal source is connected between the emitter and the base and a load is connected in the collector circuit, it is found that an implified replica of the voltage of the signal source appears across the load. The aforementioned application contains detailed directions for the fabrication of the device.

The device may take various forms, all of which have properties which are generally similar although they differ in important secondary respects. Examples of such other forms are described and claimed in an application of J. N. Shive, Serial No. 44,241, filed August 14, 1948, now matured into Patent 2,691,750, granted October 12, 1954, and an application of W. E. Kock and R. L. Wallace, Jr., Serial No. 45,023, filed August 19, 1948 and issued July 17, 1951 as Patent 2,560,579. The device in all of its forms has received the appellation Transistor, and will be so designated in the present specification.

In the foregoing Bardeen-Brattain application above referred to, there is included a tabulation of the performance characteristics of three sample transistors. In one of these, it appears that increments of signal current which flow in the circuit of the collector electrode as a result of the signal current increments which flow in the circuit of the emitter electrode exceed the latter in magnitude. This current amplification feature of transistors has become the general rule, and appears in nearly all transistors fabricated. It is discussed in detail in Patent 2,524,035, which issued October 3, 1950, on an application of John Bardeen and W. H. Brattain, Serial No. 33,466, filed June 17, 1948, which is a continuation in part of the earlier application of the same inventors, and after the filing of which the earlier application was allowed to become abandoned. It is of such importance in connection with the present invention, as well as others, that the ratio of these increments has been given a name, "$\alpha$." In the present invention, the presence of such a current gain factor, not heretofore available in conventional vacuum tube amplifiers, is turned to account in the construction of trigger circuits generally and pulse generators, single and double stability relaxation oscillators and the like in particular.

In the specification which follows the static current-voltage characteristics of a transistor are reproduced, and it is shown that, from these, a dynamic characteristic for the transistor network as a whole may be derived and that, when the current amplification factor of the transistor exceeds unity by a sufficient margin and when certain external impedance elements are properly connected and have suitable magnitudes, this dynamic characteristic has a "negative resistance" portion which is bounded on either side by positive resistance portions; i.e., the characteristic for transistor networks of one class shows three theoretically possible values of voltage for the same current, and the characteristic for transistor networks of another class shows three theoretically possible values of current for the same voltage. This leads to a controlled or controllable instability. It is shown how the domain of possible instability may be controlled in the design of the transistor network proper, and how the domain of actual instability, which may be smaller but is never greater than the theoretical domain, is controlled by adjustment of the load into which the device works, and of the operating bias potential sources. Depending on the character of the load impedance employed, the invention furnishes a self-oscillating relaxation oscillator, a single trip trigger circuit, or a "flip-flop" or double-stability trigger circuit. In the case of the relaxation oscillator, various useful wave forms are obtained, in dependence on which one of the various external impedance elements is utilized as the output load. In each case, by proper application of the principles of the invention, the tripping threshold may be made symmetrical or asymmetrical, as desired.

In a broad qualitative sense the mode of operation is as follows: Given a transistor whose current amplification factor $\alpha$ can under proper bias conditions exceed unity by a sufficient margin, and given a bias potential source which applies these conditions, then the external collector current substantially exceeds the emitter current which gave rise to it. The transistor electrodes being interconnected by way of an external circuit, a part of the collector current is fed back to the emitter in proper phase to increase the emitter current originally introduced, thus giving rise to regeneration.

As soon, however, as the positive or regenerative feedback current commences to flow, the transistor operating conditions are altered, either by reason of alteration of the electrode currents themselves, or by reason of alteration of electrode voltages by voltage drops which take place, due to such current flow, across external impedance elements which may be included in the network. This alteration soon carries the operating conditions into a domain in which the current amplification no longer exceeds unity by a sufficient margin to maintain the feedback. Such a domain is stable. In general, there are two stable domains, one on either side of the unstable domain, and the transistor proceeds from the unstable domain to one of the neighboring stable domains or to the other, in dependence on the direction of flow of the initial emitter current. There it remains unless it receives a pulse, shock, or disturbance which drives it back into the unstable domain. Because of the nature of the instability, the action is progressive, so that once started on its course into the unstable domain in either direction it continues through the unstable domain to the stable domain on the far side.

The required pulse or shock which initiates the transference of the transistor operating conditions from one stable domain to the other, by way of the intervening unstable domain, may be derived from an external source, in which case there is obtained a single trip trigger circuit or a flip-flop trigger circuit, in dependence on the arrangement of the external circuit to give one stable operating condition for the network as a whole or two. On the other hand, the necessary pulse may be derived from energy suitably stored in the course of the prior transit of the transistor through the domain of instability. Thus, in accordance with the invention in one of its principal forms, energy is stored in a reactive element in the course of one such transit, which energy initiates a return transit or stroke. Energy is again stored in the reactive element on this return stroke which suffices to initiate a third stroke, and so on. Thus there is produced a cyclic or repetitive action comprising a sequence of discontinuous jumps from one stable domain to the other and back. It is accompanied by oscillations of abrupt wave form and the network operates, in effect, as a relaxation oscillator.

Transistor networks which are adjusted to exhibit negative resistance characteristics fall into two main classes. The first class comprises networks of the voltage-controlled or short-circuit-stable type, and is exemplified by a transistor network of the grounded-emitter configuration. The operation of this network is best explained in terms of $\alpha$, the transistor current multiplication factor, and no external impedance elements are required to promote instability, although such external impedance elements are of advantage in utilizing and controlling the instability. The second class of negative resistance transistor networks comprises those of the current-controlled or open-circuit-stable type. Networks of this class are exemplified by a transistor network of grounded base configuration having an external impedance element connected in series with its base electrode. The impedance of this element plays an important part in the operation, which is best explained, not in terms of $\alpha$, but in terms of a different factor, here denoted $\beta$, a current ratio for the transistor network as a whole which is a function of $\alpha$ and of the external impedances of the network.

In the specification which follows the performance of a negative resistance transistor network of the grounded-emitter configuration and one of the grounded-base configuration are described and analyzed as representative forms of the short-circuit-stable and open-circuit-stable negative resistance networks, respectively.

The invention will be fully comprehended from the following detailed description of preferred embodiments thereof taken in connection with the appended drawings in which.

Figure 5:
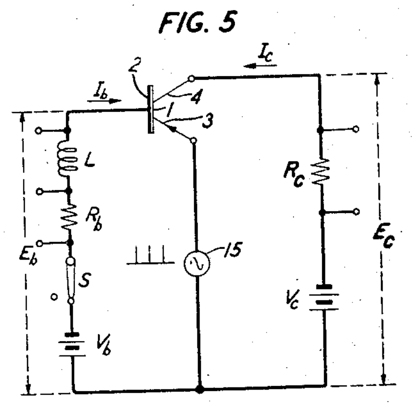
Fig. 5 is a schematic circuit diagram of a relaxation oscillator pulse generator of the grounded emitter configuration.
Figure 7A:
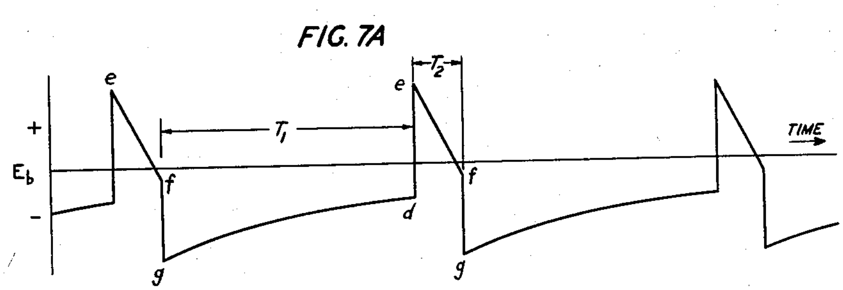
Figure 7B:
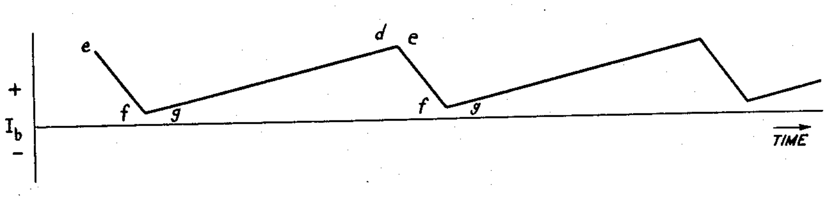
Figure 7C:
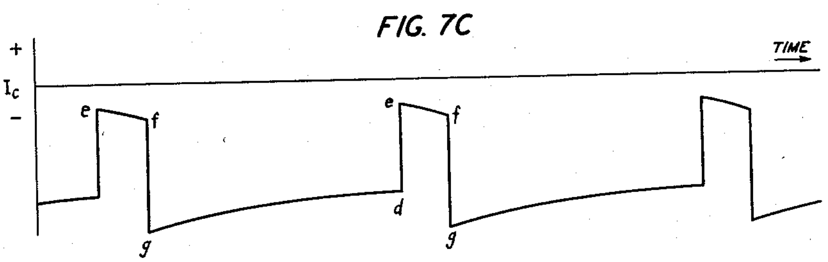

Figs. 7*a*, 7*b* and 7*c* are diagrams illustrating the output wave forms of the network of Fig. 5.

Figure 8:
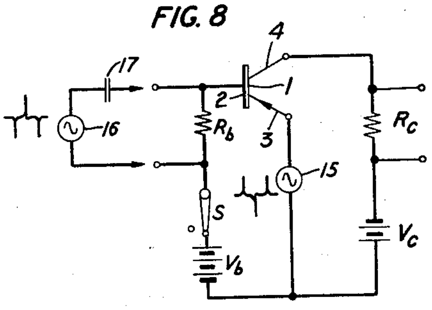

Fig. 8 is a schematic circuit diagram of a "flip-flop" or double stability trigger circuit embodying the invention.

Figure 9:
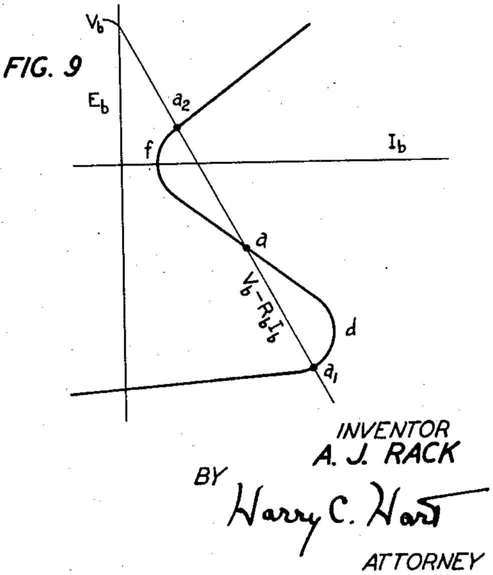

Fig. 9 is a diagram explanatory of the action of Fig. 8.

Figure 10:
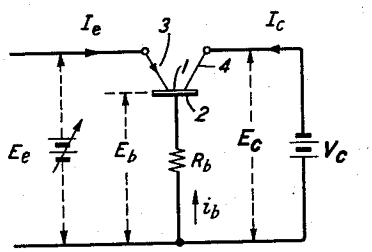
Figure 11:
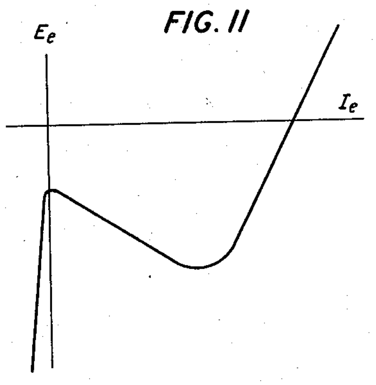

Fig. 10 is a schematic circuit diagram of a transistor network of the grounded base configuration and including a feedback resistor connected to the base;

Fig. 11 is a dynamic current-voltage characteristic of the network of Fig. 10.

Figure 12:
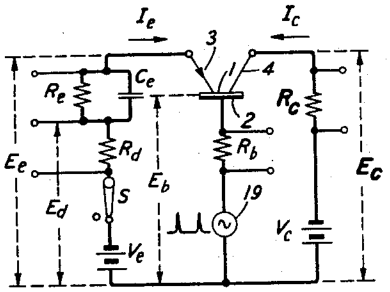

Fig. 12 is a schematic circuit diagram of a relaxation oscillator pulse generator of the grounded base configuration.

Figure 13:
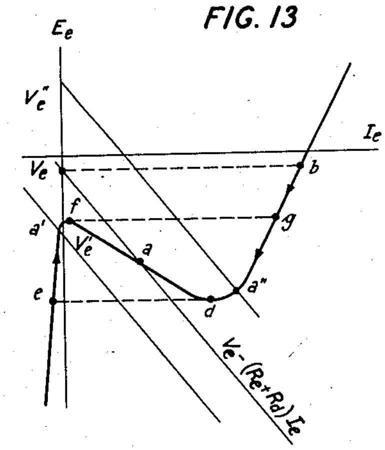
Figure 14A:
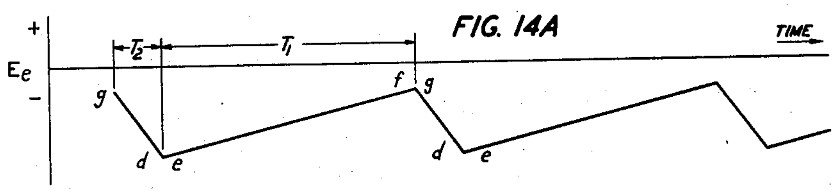
Figure 14B:
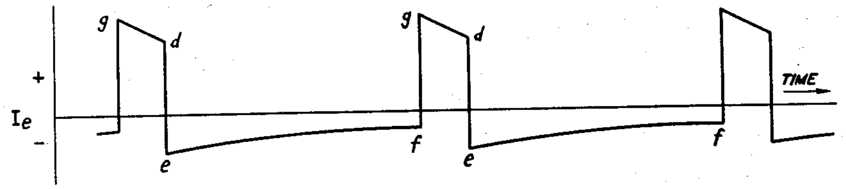
Figure 14C:
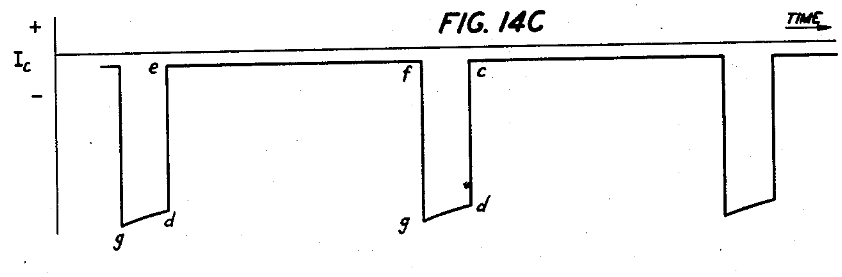

Fig. 13 is a diagram of assistance in explaining the operation of Fig. 11;

Figs. 14*a*, 14*b* and 14*c* are diagrams illustrating the output waveforms of the network of Fig. 12.

Figure 15:
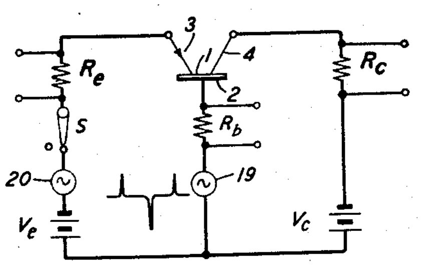
Figure 16:
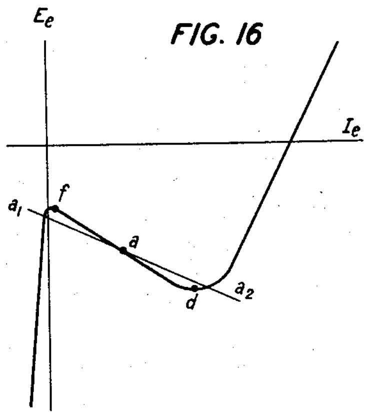

Fig. 15 is a schematic circuit diagram of a double stability or "flip-flop" trigger circuit modification of Fig. 12;

Fig. 16 is an explanatory diagram illustrating the operation of Fig. 15.

Figures 2, 4, 6:
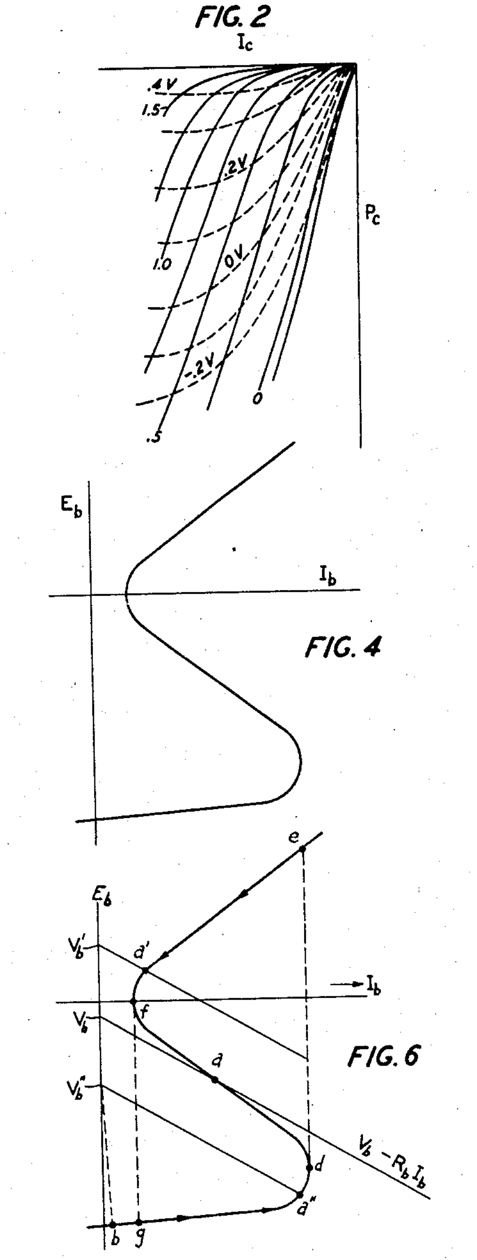
Fig. 2 is a family of transistor static characteristics.
Fig. 4 is a dynamic current voltage characteristic of the transistor network of Fig. 3.
Fig. 6 is a diagram of assistance in explaining the operation of Fig. 5.
Figure 17:
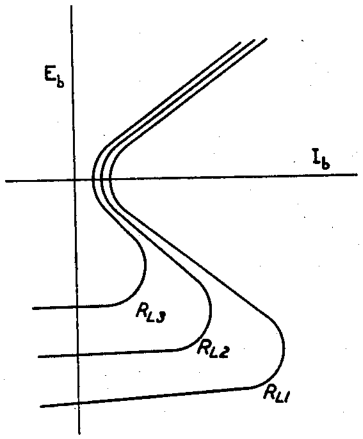
Figure 18:
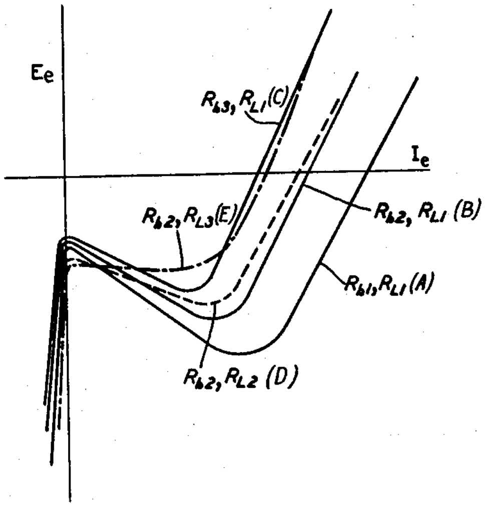

Fig. 17 is a family of characteristics of which one member is the characteristic of Fig. 4; and, Fig. 18 is a family of characteristics of which one member is the characteristic of Fig. 11.

Figure 1:
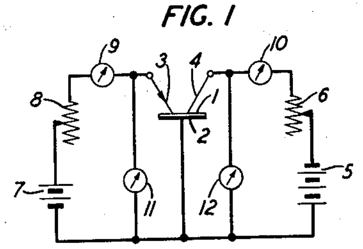
Fig. 1 is a schematic circuit diagram of apparatus for determining the static characteristics of a transistor.

Referring now to the drawings, Fig. 1 shows a transistor network of the grounded base configuration. The transistor itself comprises a block 1 of semiconductor material such, for example, as high back voltage germanium prepared in the manner described in "The Transistor, A Semiconductor Triode" by J. Bardeen and W. H. Brattain, published in the Physical Review, volume 74, page 230, July 15, 1948. The block 1 has a low resistance base electrode 2 in contact with one face thereof, and two point contact electrodes in closely spaced contact engaging the opposite face. The contact 3 designated by the arrowhead is the emitter and the nearby contact 4 is the collector. As fully described in the aforementioned applications of John Bardeen and W. H. Brattain, the transistor gives the greatest amount of amplification, especially current amplification, when the emitter electrode 3 is biased positively with respect to the base 2 by a fraction of a volt while the collector 4 is biased negatively by 40 to 100 volts. In the figure, a battery 5 supplies the large negative bias to the collector by way of an adjustable resistor 6 while another smaller battery 7 supplies the positive bias to the emitter by way of another adjustable resistor 8. Milliammeters 9, 10 are connected in series with the emitter and the collector, respectively, for determining the magnitudes of the emitter and collector currents, while voltmeters 11, 12 are connected from the emitter to the base and from the collector to the base, respectively, for determining the corresponding voltages.

By varying the electrode potentials, as by adjusting the resistors 6, 8 to different values, it is possible to obtain numerous data on the transistor. Each datum comprises four quantities, namely emitter current, emitter voltage, collector current and collector voltage; and these four quantities, taken together, completely define one single condition of transistor operation.

It is convenient from the standpoint of what follows to plot these data in the form of two families of curves. In the first family, represented by the solid curves of Fig. 2, each curve represents the collector current $I_c$ as a function of the collector voltage $P_c$, the emitter current $I_e$ being held constant along the curve and differing from curve to curve. In the second family, represented by the broken curves, each curve represents the collector current $I_c$ as a function of collector voltage $P_c$, the emitter voltage $P_e$ being maintained constant along the curve and differing from curve to curve. Following established conventions, transistor electrode currents are in each case taken as positive when flowing into the transistor from the external circuit and voltages are taken as positive when measured from the base to the emitter or to the collector as the case may be. Hence, since in operation the collector bias voltage is negative and current flows out of the transistor, so that the inflowing current is negative, the curves of both families lie in the third quadrant of the figure.

Figure 3:
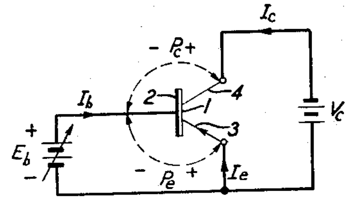
Fig. 3 is a schematic circuit diagram of a transistor network of the grounded emitter configuration exhibiting bounded negative resistance characteristics.

Fig. 3 shows a transistor network of the grounded emitter configuration, with the electrodes biased for operation most favorable to the invention, that is, to give substantial current amplification over a range. Measured from the base 2, the emitter 3 is slightly positive and the collector 4 is negative by some 40 to 100 volts. The sum of these two voltages is equal to the emitter-to-collector voltage which, in turn, is determined by the potential of the source $V_c$. Furthermore, taking inward flowing currents as positive, the sum of the base current $I_b$, the emitter current $I_e$ and the collector current $I_c$ is zero. That is to say $$V_c = P_c - P_e \quad (1)$$

$$E_b = -P_e \quad (2)$$

$$I_b = -(I_e + I_c) \quad (3)$$

The relation connecting the base current $I_b$ and the base voltage $E_b$ can be determined in the following manner. For a selected value of $P_e$, $P_c$ is greater by $V_c$; for, from (1), $$P_c = P_e + V_c$$

The values $P_c$ and $P_e$ thus found determine one of the broken curves and the ordinate in Fig. 2, and thus a point in the plane. The solid curve passing through this point gives the emitter current $I_e$ and the abscissa of the point gives the collector current $I_c$.

Then, from (2), $E_b$ is the negative of $P_e$ as selected, while from (3) $I_b$ is the negative of the sum of the two currents determined. $E_b$ and $I_b$ as thus obtained determine a point in a plane whose coordinates are $E_b$ and $I_b$.

Repetition of this process for a succession of selected values of $P_e$ furnishes data wherewith to plot a curve of $E_b$ vs. $I_b$. When this is done, it turns out that the form of the curve is as shown in Fig. 4. In the region between the peaks, in which voltage increases negatively with positive increase of current, this curve represents a negative resistance; while over the end portions of the curve, where voltage and current increases have the same sign, the resistance is positive. Because of its shape, the curve is called an S curve.

The inner, negative resistance part of the curve corresponds to transistor conditions in which its current multiplication factor, $\alpha$, exceeds unity. This is readily shown as follows. Suppose a small voltage change $\Delta E_b$ to be applied to the base, positively toward the emitter. It will tend to cause an increment in the emitter current, $\Delta I_e$, flowing upward to the block. Disregarding the effect of $\Delta E_b$ on $I_c$, since it is neligibly small compared with $V_c$, then the resulting change in $I_c$ is outward from the block and of magnitude in excess of $\Delta I_e$; i.e., $$-\Delta I_c = \alpha \Delta I_e$$

where $\alpha$ is the current multiplication factor of the transistor. This current flows to the junction of the emitter lead and the base lead, where one part flows to the emitter and another part flows to the base. From Kirchoff's first law applied to the junction point, it follows that the fraction flowing to the base is $$\Delta I_b = (\alpha - 1)\Delta I_e$$

which is positive when $\alpha$ exceeds unity. Thus, when $\alpha$ exceeds unity, the base current increment is of opposite sign to the base voltage increment causing it, or the base-to-emitter resistance is negative. Similarly, when $\alpha$ is less than unity, the contrary is true. The negative resistance domain of the transistor, therefore, is that in which $\alpha > 1$, and it is bounded on both sides by positive resistance domains in which $\alpha < 1$.

The bounded negative resistance feature of the transistor network of Fig. 3, as represented by the dynamic characteristic of Fig. 4, may be turned to account in various ways. Suppose, for example, that a resistor $R_b$ and an inductance coil L be connected in series with a switch S and a potential source $V_b$ to ground as in Fig. 5 and, disregarding the pulse source 15 for the present, to the emitter 3. To depict the performance of this network the dynamic characteristic of Fig. 4 has been duplicated in Fig. 6 and a load line of slope $R_b$ has been drawn to represent the effect of the base resistor $R_b$. With suitably chosen values of the resistance of this base resistor $R_b$ and of the base battery $V_b$, this load line intersects the dynamic characteristic in a point *a* on its negative resistance portion, and nowhere else. When the slopes of the load line and of the dynamic characteristic at the point of intersection are as shown in Fig. 6, the network of Fig. 5, disregarding the presence of the inductance coil L, is stable; if it be subjected to a small disturbance, it tends to return to the distribution of currents and voltages indicated by this intersection point *a*.

The presence of the inductance coil L, however, alters the situation because, while it offers no substantial impedance to direct or steady currents, it constitutes a very high impedance to transient currents, effectively increasing the slope of the load line to a value such that it is no longer less than the slope of the negative part of the dynamic characteristic, and so intersects it in more than one point. Any small disturbance then gives rise to oscillatory behavior which proceeds in the following manner.

The inductance coil L prevents sudden changes from taking place in the current through it and hence, for a rapid change in voltage, it behaves as though it were an open circuit. Before the switch S is closed, the base current $I_b$ is, of course, zero. When the switch S is first closed, the high impedance of the coil causes this zero base current to be departed from only gradually, though the voltage of the source is applied to the network suddenly. Therefore, at the instant of switch closure, the first operating point is at *b* on the lower branch of the S-shaped curve of Fig. 6. This is very far from the equilibrium condition represented by the intersection point *a* and the network tends to readjust itself to the point *a*, the operating point moving along the lower branch of the curve in the direction of the arrows, past the point *g*, toward the point *d*. With the large negative voltage applied to the base electrode of the transistor, as represented by the lower branch of the curve of Fig. 6, the internal base-to-emitter resistance of the transistor is small, and so the inductance of the coil L constitutes a large part of the total impedance of the circuit mesh which interconnects the base with the emitter. Therefore, the change of condition along this lower branch of the curve takes place slowly. This is illustrated in Figs. 7*a* and 7*b* which show the changes in the base voltage and base current as functions of time. The rise in voltage from the point *g* to the point *d* is comparatively small in magnitude and occupies a large fraction $T_1$ of a full cycle. So, too, the base current increases slowly during the same period.

At the point *d*, the slope of the S-curve of Fig. 6 changes from positive to negative. For the operating point to continue to move along the S-curve would require a rapid change in the direction of the base current $I_b$. Up to this point the base current has been continuously increasing in the positive direction. Now, however, it is required suddenly to change its direction. The inductance coil will not permit such a sudden current change. The current therefore continues to increase, causing a sudden surge of voltage and snapping the operating point along a constant current line to the point *e*. This is indicated in Fig. 7*a* by the vertical rise in the wave form from *d* to *e*. Here the voltage across the coil again commences to decay and moves the operating point along the S-curve toward the point $f$, in the direction of the arrows. On this, the upper branch of the S-curve, the endeavor of the system to approach the point $a$ requires a reduction both in the base voltage and in the base current. The slope of the upper branch of the S-curve is much greater than that of the lower branch, which means that the variational resistance of the internal base-to-emitter impedance is high; so high, indeed, that this resistance constitutes a major part of the total impedance of the circuit mesh interconnecting the emitter with the base. Therefore the decay of the voltage across the coil takes place much more rapidly, as is indicated by the steeper negative slope in the wave form of Fig. 7$a$ from the point $e$ to the point $f$, and also by the steeper fall of current in Fig. 7$b$ between the same points.

At the point $f$ the current, which is now decreasing at a substantial rate, is required suddenly to change to an increasing current, if the operating point is to remain on the S-curve. The inductance of the coil prevents this sudden change and causes the operating point to snap along a constant current line to the point $g$ on the lower branch of the curve. This is illustrated in Fig. 7$a$ by the vertical drop from $f$ to $g$ and in Fig. 7$b$ by the reversal of the rate of change of the current. Here, at the point $g$, both the current and the voltage again start to rise along the lower branch of the curve and the cycle has started to repeat itself.

Thus the network is, in effect, always trying to reach the equilibrium conditions represented by the intersection point at $a$, but is prevented from doing so by the inclusion of the series inductance. Thus, the network oscillates freely about the point $a$ quite apart from the application of pulses from an external source. As with other self-oscillating systems which depend for their operation on non-linear elements, it may be locked in synchronism with an external source, for example, by the application of pulses of the generator 15.

The wave form of the collector current, as it changes throughout each successive cycle of operation, as above described for the first cycle, is illustrated in Fig. 7$c$. Its configuration may be explained as follows: In the interval $T_2$ the base of the transistor is positive with respect to the emitter. Under these conditions, variations of the voltage between the base and the emitter have substantially no effect on the collector current. This is illustrated by the substantially horizontal portion of the collector current wave in Fig. 7$c$. Just prior to the termination of this period the base goes negative with respect to the emitter, whereupon the emitter commences to take control of the collector current and the collector current begins to increase in the negative direction. Before it has increased greatly, however, the point $f$ is reached and, as explained above in connection with Figs. 6 and 7$a$, the base voltage snaps along a constant current line to $g$. The collector current does likewise. The magnitude of the negative collector current at the point $g$ is merely the saturation value of the collector current for the particular transistor employed. The collector current maintains this saturation value, changing only by a slight amount as the operating point moves from $g$ to $d$ in Fig. 6.

Figs. 7$a$, 7$b$ and 7$c$ show respectively a saw-toothed wave with substantial pauses between pulses, a saw-toothed wave of the more conventional variety without such pauses, and a square-topped wave. Each of these waves is of a form which is frequently desirable in connection with communication and other problems. Still other periodic wave forms may be generated by utilizing differentiating circuits or integrating circuits to obtain the derivatives or the integrals of these waves, as the case may be.

Because the elements $R_b$ and $R_c$ are pure resistances, the wave forms of the voltages which appear at load terminals connected across these elements are the same as the wave forms of the currents $I_b$ and $I_c$ which flow through them.

The network of Fig. 5 can be caused to operate as a single trip trigger circuit by adjustment of the potential of the source $V_b$ to a new value $V_b'$ or $V_b''$ such that the load line is moved upward or downward so that its intersection with the dynamic characteristic occurs on one of the positive resistance branches, i.e., at $a'$ between $e$ and $f$ or at $a''$ between $g$ and $d$. The conditions represented by each of these intersection points are stable, and the network remains quiescent until it is forced into the unstable domain by application of a pulse derived, for example, from the pulse generator 15. With the intersection at the point $a''$, application of a negative trigger pulse to the emitter or a positive pulse to the base raises the net base voltage up past the point $d$, whereupon the network goes through one complete cycle of operations in the manner described above. Similarly. if the stable operating point is at $a'$, the trigger pulse must be of opposite polarity, namely, a positive pulse on the emitter or a negative pulse on the base. Otherwise, the action is similar. The latter arrangement is preferred because the potential required of the source is less and because the transistor draws less quiescent current at $a'$ than at $a''$.

A "flip-flop" or double stability trigger circuit network is obtained by removing the inductance L, as in Fig. 8, and increasing the value of the external resistance $R_b$ as shown in Fig. 9, until the slope of the load line is greater than the slope of the negative resistance portion of the characteristic, so that there are three intersection points, $a$, $a_1$, $a_2$. The point $a$ is now unstable. It is because of the fact that the network of Fig. 5 may be rendered unstable by an increase of its external resistance, that it is classified as a member of the short-circuit-stable class. If the circuit is quiescent at the point $a_1$, a positive voltage pulse applied to the base electrode triggers the circuit past the unstable point $a$ to the other stable condition represented by the point $a_2$, where it remains until the application of a pulse of the opposite polarity which causes it to snap back to the position $a_1$. Tripping pulses may be derived from the pulse source 15 in series with the emitter or from a source 16 connected, by way of a blocking condenser 17, across the base resistor $R_b$.

By adjustment of the battery voltage and the load resistance $R_b$, such a circuit may be employed as a slicer, the slicing threshold for positive pulses being determined by the distance separating the points $a_1$ and $d$, while the slicing threshold for negative pulses is determined by the distance between the points $a_2$ and $f$. These thresholds may be adjusted over wide magnitudes and may be made alike or unlike as desired merely by adjusting the magnitudes of the battery voltage $V_b$ and the load resistance $R_b$.

The invention is not restricted to transistor networks of the short-circuit-stable class, or of the grounded emitter configuration, but is applicable equally well to networks of the open-circuit-stable class. Of these, a network of the grounded base configuration is a good example, with the proviso that the base resistance $R_b$ is no longer the sole controlling impedance element and that the condition that $\alpha$ shall be in excess in unity is no longer the sole criterion of instability. This will be explained in connection with Fig. 10 which shows a controlled instability network of the grounded base configuration, including an external base resistor $R_b$, and with Fig. 11 which shows its dynamic characteristic. It will be noted that a major difference between Fig. 10 and Fig. 3 is that, in Fig. 10, both the base-to-emitter voltage and the base to collector voltage now depend in large measure on the voltage drop across the base resistor $R_b$. Introducing the symbols $E_e$ for the voltage from ground to emitter and $V_c$ for the collector battery voltage which in Fig. 10 is equal to the voltage from ground to collector, the relation between the currents and voltages may be written at once from well-known principles of circuit analysis as follows:

$$E_e=P_e+(I_e+I_c)R_b \quad (4)$$

$$V_c=P_c+(I_e+I_c)R_b \quad (5)$$

or $$P_c+I_cR_b=V_c-I_eR_b \quad (5a)$$

The relation between $E_e$ and $I_e$ may now be obtained in the following manner. An arbitrary value of collector-to-ground voltage $V_c$ and a sufficiently large value of the base resistor $R_b$ are first selected. These are to remain fixed throughout the ensuing graphical construction process. Next, a first working value of $I_e$ is selected, and the quantity $$V_c-I_eR_b$$

is computed. From Equation 5*a*, this is a value of $P_c$ when $I_c=0$, and therefore it establishes a point on the $P_c$ axis of Fig. 2. Through this point, a line is drawn having the slope $R_b$. This line intersects the solid (constant $I_e$) curve whose value of $I_e$ is the assumed one. This intersection establishes a point in the $I_c$—$P_c$ plane. $I_c$ is read off as the abscissa of this intersection point, while $P_e$ is obtained from the broken curve which passes through the intersection point. Now that $I_c$ and $P_e$ have been determined, they are used, along with the assumed value of $I_e$, to determine $E_e$ from Equation 4. Repetition of this process for different assumed values of $I_e$, always holding $V_c$ and $R_b$ fixed, gives a set of paired values of $E_e$ and $I_e$.

These paired values are now plotted, one against the other, and for most transistors this plot has the form shown in Fig. 11. From its shape it is termed an N curve, and it represents the dynamic characteristic of the transistor network of Fig. 10. It will be observed that in this curve, the portion which lies between the upper peak and the lower one has a negative slope, which represents a negative resistance of the transistor network. Throughout this region the curve shows that the emitter current $I_e$ is a three-valued function of the emitter voltage $E_e$. For example, to a single value of the emitter voltage $E_e$ represented by the horizontal line, there correspond three distinct and separate values of the current of which the first and third are stable values while the second one is unstable.

The dynamic characteristic, Fig. 11, of the transistor network of Fig. 10 contains a negative resistance portion only when the transistor itself is one whose current multiplication factor exceeds unity. This restriction will be understood from the following analysis.

Rewriting Equation 4 for small changes in the variables, there results $$\Delta E_e=\Delta P_e+(\Delta I_e+\Delta I_c)R_b \quad (6)$$

Examination of the static curves of Fig. 2 shows that for a positive increment $\Delta I_e$ the increment $\Delta P_c$ is also positive while the increment $\Delta I_c$ is negative throughout the region corresponding to the negative resistance part of Fig. 11. Hence, taking absolute values, Equation 3 becomes $$\Delta E_e=|\Delta P_e|+(|\Delta I_e|-|\Delta I_c|)R_b \quad (7)$$

Dividing this equation by $\Delta I_e$, and introducing the definitions $$\frac{\Delta I_c}{\Delta I_e}=\beta$$

(current ratio)

$$\frac{\Delta E_e}{\Delta I_e}=R_0$$

(input resistance of the network of Fig. 3)

there is obtained the relation $$R_0=\left|\frac{\Delta P_e}{\Delta I_e}\right|+(1-\beta)R_b \quad (8)$$

As above pointed out, $\Delta P_e$ and $\Delta I_e$ are always of the same sign so that the first term is always positive. Therefore, if the input resistance $R_0$ is to be negative, the second term must be negative and must more than offset the first; i.e., $$(\beta-1)R_b\geq\left|\frac{\Delta P_e}{\Delta I_e}\right| \quad (9)$$

or $$R_b\geq\frac{1}{\beta-1}\left|\frac{\Delta P_e}{\Delta I_e}\right| \quad (10)$$

Now the current multiplication factor "$\alpha$" as employed in the aforementioned applications is defined as the ratio of a signal frequency collector current increment to the corresponding signal frequency emitter current increment in a circuit of the grounded base configuration when the collector is short-circuited to the base. The current ratio $\beta$ is defined as above for a network which includes a resistor $R_b$ in series with the base. Thus $\beta$ is not the same as $\alpha$. In general it is less than $\alpha$, since any positive external impedance in the base-to-collector circuit necessarily reduces the collector current.

Thus, with a network of the kind under discussion, unless $\alpha$ exceeds unity, it is impossible to obtain a curve such as that of Fig. 11 and having a negative resistance portion.

Once a transistor network whose dynamic characteristic has the form shown in Fig. 11 has been constructed, it is possible to put it to use in various ways. Suppose, for example, that a resistor $R_e$ be connected in series with a potential source $V_e$ and a switch S between the emitter and ground, as in Fig. 12. To depict the performance of this network, the curve of Fig. 11 has been duplicated in Fig. 13, and a load line of slope $R_e$ has been drawn to represent the effect of the external resistor $R_e$. With suitably chosen values of the voltage of the source $V_e$ and of the resistor $R_e$, this load line intersects the dynamic characteristic on its negative resistance portion, as at the point *a*. Because the slope of the load line exceeds the slope of the negative resistance part of the curve, this intersection point represents stable operating conditions. However, suppose the external resistor $R_e$ to be shunted by a condenser $C_e$ of large admittance at high frequency. The action is now entirely different, the condenser $C_e$ resisting any sudden change in voltage and hence behaving practically as a short circuit for a rapid change in current. When the switch S is first closed, the condenser $C_e$ being uncharged, a large voltage first appears across the transistor which then draws a large current, as at the point *b*. To prevent this large initial current from burning out the unit, a small protective resistor $R_d$ may be included to limit it. This large surge of current rapidly charges the condenser $C_e$, thereby reducing the emitter voltage $E_e$ below the battery voltage $V_e$ and bringing the operating condition down along the curve of Fig. 13 to the point *d*. Here a small change in voltage, still in the decreasing direction, causes a large and rapid reduction in the current. By virtue of the short-circuiting action of condenser $C_e$ the current suddenly snaps along a constant voltage line to the point *e*. At this point the transistor resistance is large and therefore the condenser $C_e$ discharges through the external resistor $R_e$, thus raising the emitter voltage along the curve to the point *f*. Here again a minute change in voltage requires a large change in current to support it and the current therefore snaps suddenly to the point *g*, such snapping action being again rendered possible by the presence of the condenser $C_e$ which effectively short-circuits the external resistor $R_e$ for rapid transient changes.

At this point the cycle starts to repeat. The network is in effect always trying to reach the stable operating conditions represented by the point *a*, but is prevented from doing so by the low impedance to rapidly changing current which is presented by the condenser $C_e$. Hence, the shunting effect of the condenser $C_e$ around the resistance $R_e$ in Fig. 12 causes the network to become self-oscillatory and to engage in sustained self-oscillations, quite apart from the application of pulses from any external source. As with the network of Fig. 5, these sustained self-oscillations may be locked in step with an external source, for example, by the application of pulses of the generator 19.

The emitter voltage $E_e$ is plotted as a function of time in Fig. 14*a* while the wave form of the corresponding emitter current $I_e$ is similarly plotted as a function of time in Fig. 14*b*. As above explained, the network of Fig. 12 changes its operating condition almost discontinuously along the constant voltage lines *f*—*g* and *d*—*e*. This is illustrated in Figs. 14*a* and 14*b* in which the current is shown to change suddenly between *d* and *e* and again between *f* and *g*, while the voltage, Fig. 14*a*, merely carries out a rapid alteration of its rate of change. In the portion $T_1$ of the cycle, wherein the operating condition is changing from the point *e* of Fig. 13 to the point *f*, the internal resistance of the transistor is large and as a consequence the rate of discharge of the condenser $C_e$ can be controlled by adjusting the magnitude of the resistor $R_e$ through which, during this portion of the cycle, it discharges. On the other hand, during the portion $T_2$ of the cycle, from *g* to *d*, the internal resistance of the transistor is much smaller, and during this portion of the cycle the condenser rapidly charges through the low transistor resistance in series with the protective resistor $R_d$. This accounts for the fact that the voltage falls from *g* to *d* much more rapidly than the rise from *e* to *f*.

Fig. 14*c* shows the wave form of the collector current which flows during the cycle of operations above described. The wave form of this current is more nearly a square-topped wave than that of the emitter current, although, generally speaking, it follows the same course. It changes less between *g* and *d* than does the emitter current for the reason that, in this region of operation, the transistor is working at or close to collector current saturation. On the other hand, in the portion between *e* and *f*, the emitter current is negative, under which condition it exerts substantially no control on the collector current other than to hold it to the small negative value shown between the points *e* and *f* of Fig. 14*c*.

As in the case of Figs. 7*a*, 7*b* and 7*c*, the exact wave forms of Figs. 14*a*, 14*b* and 14*c* can be predetermined by graphical methods from the static characteristics of the transistor, Fig. 2.

Because the impedance elements $R_b$ and $R_c$ are pure resistances, it is evident that the voltages $E_d$ and $E_c$ are directly proportional to the emitter current and the collector current, respectively, so that the wave forms of these voltages are similar in character to the waves of Figs. 14*b* and 14*c*, respectively.

A displacement of the load line upward or downward in Fig. 13 moves the point of intersection of this load line with the dynamic characteristic to the point *a'* or the point *a''*. This is accomplished simply by changing the voltage of the source $V_e$ to new values $V_e'$ or $V_e''$. The intersection point is now on a positive resistance portion of the dynamic characteristic so that the system now is stable and remains quiescent unless it is forced into the unstable condition by application of a pulse. With the conditions as indicated by the intersection point *a'*, application of a positive trigger pulse to the emitter or a negative pulse to the base raises the effective emitter voltage up and through the point *f*, whereupon the network goes through one complete cycle of operation in the manner described above. Similarly, if the stable operating point is at the point *a''*, the trigger pulse must be of opposite polarity, namely, a negative pulse on the emitter or a positive pulse on the base. Otherwise, the action is similar. The former arrangement is preferred because of the fact that during the rest condition at *a'* the emitter current is small.

The action of the network as thus modified is that of a single trip trigger circuit which may be tripped by the application of pulses, for example from a pulse generator 19 located at any convenient point in the base-to-emitter circuit and whose return time may be controlled over wide limits by adjustment of the magnitudes of the condenser $C_e$ and the resistor $R_e$.

Suppose now, as in Fig. 15, that the condenser $C_e$ be removed and the resistance of the external resistor in the emitter circuit $R_e$ be reduced until its slope is less than the slope of the negative resistance portion of the dynamic characteristic. This is the condition for instability of a network of the open-circuit-stable class. By appropriate adjustment of the potential of the battery $V_e$, the intersections of the load line with the dynamic characteristic now become as shown in Fig. 16. Here the points $a_1$ and $a_2$ are stable operating points while the point *a* is unstable because the positive resistance of the load is less than the negative resistance of the energy source, namely, the transistor network. Suppose that the network be quiescent at the point $a_1$. Application of a positive pulse to the emitter or a negative pulse to the base of a magnitude such as to bring the net emitter voltage $E_e$ above and beyond the point *f* causes the current suddenly to snap to the right-hand branch of the characteristic curve and thereafter rapidly decreases to the point $a_2$. Since, as above stated, the point $a_2$ is a stable operating point, conditions remain there until a pulse of opposite polarity is applied and of a magnitude such as to drive the emitter voltage below and beyond the point *d*, whereupon the current suddenly snaps to the left-hand branch and thereafter rapidly moves along the characteristic to the point $a_1$ where it again remains. The action of the network of Fig. 15 is thus what is commonly termed a "flip-flop" or double stability trigger circuit. It is well adapted, for example, to use as a slicer, in which case the voltage input to be sliced is applied in series with the battery voltage $V_e$ and the external emitter resistance $R_e$ is adjusted until the two stable operating points $a_1$ and $a_2$ are suitably located with respect to the margin of instability points *f* and *d*, respectively. The slicing threshold for positive pulses is determined by the distance between the point $a_1$ and the point *f* while the slicing threshold for negative pulses is determined by the distance between the point $a_2$ and the point *d*. These may be made equal or unequal, large or small, as desired, by the mere adjustment of the magnitude of the external resistor $R_e$ and the voltage of the emitter battery $V_e$.

The invention has been expounded in connection with one illustration of a short-circuit-stable transistor network of the grounded-emitter configuration, Figs. 5 and 6, and in connection with one illustrative embodiment of an open-circuit-stable negative resistance transistor network of the grounded-base configuration. Transistor networks having negative resistance characteristics under various conditions of adjustment of the associated impedance elements are known and a number of them have been described in an application of H. L. Barney, Serial No. 58,685, filed November 6, 1948, and now matured into Patent 2,585,078, granted February 12, 1952. All such negative resistance transistor networks are characterized by a domain of operation in which the resistance is negative, bounded on either side by domains in which it is positive. Generally speaking, in the central or negative resistance domain, a current multiplication factor which relates a current in one part of the network to a current in another part of the network for the particular circuit configuration exceeds unity, and, in the bordering positive resistance domains, falls below this value. The principles of the present invention are applicable to any such negative resistance transistor network whose resistance characteristic comprises a central negative portion bounded by positive resistance portions on either side, and, by following the principles of the invention, relaxation oscillators, single trip trigger circuits, and flip-flop trigger circuits may be constructed utilizing any such negative-resistance transistor network that may appear to be suitable, and as desired.

The invention contemplates the control of the negative resistance domain, i.e., of the extent of the negative resistance portion of the characteristic. In the case of the grounded emitter network, the magnitude of the negative resistance is increased, and the extent of the negative resistance portion of the characteristic is reduced, by the addition of resistances in series with the collector, the emitter, or the base. Thus, in Fig. 17, the S curve of Fig. 4 or Fig. 6 is reproduced as the curve $R_{L1}$, for a resistance $R_c$ of 1,000 ohms or so, included in the network of Fig. 5 principally to protect the transistor from burn-out due to excessive collector currents. When the external resistance $R_c$ in the collector circuit is increased to 5,000 ohms and to 20,000 ohms, the corresponding transistor network characteristics are as indicated by the S curves $R_{L2}$ and $R_{L3}$, respectively. It will be observed that as the load resistance is progressively increased the negative resistance portion of the characteristic becomes shorter thus representing a progressive reduction in the extent of the negative resistance domain and a larger value of the negative resistance.

Variation in the character of the S curve which, in a broad sense is the same as the foregoing, but differs in minor detail, results from inclusion of an external resistor in the emitter circuit in series with the emitter electrode or in series with the base electrode. In general, the shape of the S curve is most sensitive to changes in the base resistance and least sensitive to changes in the collector resistance, its sensitivity to changes in the emitter resistance being intermediate.

In the case of the grounded base network of Figs. 10, 12 and 15, the designer has still more freedom in adjusting the external network elements to produce an N-curve of a desired shape. Thus, in Fig. 18, the N-shaped characteristic of Fig. 11 has been reproduced as the curve B, while the curve A shows the characteristic which results when the magnitude of the resistor in series with the base electrode is increased and the curve C shows the characteristic which results when the magnitude of the base resistor $R_b$ is reduced. In these three curves A, B and C, the resistor $R_c$ in the collector circuit in series with the collector has been held constant, for example at 1,000 ohms or so, included for protection of the transistor. If, on the other hand, the base resistance $R_b$ is held constant at the value which gives the curve of Fig. 4 and the external collector resistance $R_c$ is varied, then, as the external collector resistance $R_c$ is progressively increased, the characteristic takes on in succession the configurations indicated by curves B, D and E. It will be observed that in this case the progressive changes consist for the most part in rocking the negative resistance portion of the transistor network characteristic about its own midpoint, without greatly changing its length. This represents an alteration in the value of the negative resistance of the transistor network without altering the extent of the domain in which it appears. When, on the other hand, the collector resistance $R_c$ is left unchanged and the base resistance is altered, as in the case of curves A, B and C, then the value of the negative resistance is changed only slightly while the extent of the domain in which it occurs undergoes a substantial alteration.

By reference to the foregoing detailed description of the connections and mode of operation of the transistor networks chosen to illustrate the invention, whether of the grounded-emitter configuration or the grounded base configuration, whether operated as oscillators, single trip trigger circuits or flip-flop devices, it will be apparent to those skilled in the art that each alteration of the elements of the external network to give an S-curve or an N-curve of preassigned shape results in a corresponding alteration of the output wave form of the device, of its impedance as seen at its terminals, and of the magnitudes of the reactive elements suitable for most effectively sustaining self-oscillations.

Trigger circuits, especially relaxation oscillators, have been constructed utilizing the teachings of the invention and embodying its principles whose performance is satisfactory at frequencies of 50 megacycles per second; i.e., frequencies far higher than those at which negative resistance phenomena can be developed with systems utilizing two-electrode rectifiers of the point-contact variety.

Various modifications of the invention, and various ways of applying its principles in addition to those hereinabove described will occur to those skilled in the art.

What is claimed is:

1. A triggered flip-flop circuit comprising a semiconducting body, a base electrode, an emitter electrode, and a collector electrode in contact with said body, means including a source of voltage connected to said electrodes for biasing said base and collector electrodes in a relatively non-conducting polarity and for normally biasing said base and emitter electrodes in a relatively conducting polarity, an impedance element connected between said source and said base electrode for controlling the effective voltage between said emitter and base electrodes in accordance with the current flowing therethrough, means for impressing pulses effectively between said emitter and collector electrodes, thereby to trigger said circuit from one stable condition of current conduction to its other stable condition of current conduction, and an output circuit including said impedance element.

2. A free-running relaxation oscillator comprising a semiconductor device having a semiconducting body, a base electrode, an emitter electrode and a collector electrode in contact with said body, means for applying a voltage in the reverse direction between said collector and base electrodes, a source of voltage, a resistor connected serially with said source between said emitter electrode and a common junction point, an impedance element connected between said base electrode and said junction point, said source being so poled and connected as to apply normally a voltage in the forward direction between said emitter and base electrodes, and a capacitor connected between said emitter electrode and a point of substantially fixed potential.

3. A triggered relaxation oscillator comprising a semiconductor device having a semiconducting body, a base electrode, an emitter electrode and a collector electrode in contact with said body, a network interconnecting a common junction point with each of said electrodes and including means for applying operating potentials to said electrodes, said network further including a first impedance element connected between said collector electrode and said junction point, a second impedance element connected between said base electrode and said junction point and a resistor serially connected between said emitter electrode and said means for applying potentials, a capacitor connected between said emitter electrode and a point of substantially fixed potential, and means for applying trigger pulses between one of said electrodes and said junction point.

4. A triggered flip-flop circuit comprising a semi-conducting body, a base electrode, an emitter electrode and a collector electrode contacting said body, a first source of voltage connected between said base and collector electrodes for biasing them in a relatively non-conducting polarity, a resistor connected between said first source and said base electrode, a second source of voltage connected between said first source and said emitter electrode for normally biasing said base and emitter electrodes in a relatively conducting polarity, said resistor controlling the effective voltage between said emitter and base electrodes in accordance with the current flowing through said resistor, and means including an impedance element for impressing pulses effectively between said emitter and collector electrodes, thereby to trigger said circuit from one stable condition of current conduction to its other stable condition of current conduction.

5. A bistable triggered circuit comprising a current-multiplication transistor including a semi-conducting body, a base electrode, an emitter electrode and a collector electrode in contact with said body, an external network interconnecting said electrodes with a common junction point and including a first impedance element and a first source of operating potential in series arrangement connected between said base electrode and said junction point, a second impedance element and a second source of operating potential in series arrangement connected between said collector electrode and said junction point, said sources of operating potential being respectively poled to apply reverse bias between said collector electrode and said base electrode, said emitter electrode being conductively connected directly to said junction point, means providing an output circuit connection across said second impedance, and means connected across said first impedance element for providing an input connection, said bistable triggered circuit thereby having a stable state of low current conduction and a stable state of high current conduction.

6. A bistable triggered circuit as defined in claim 5 wherein said first impedance element is a resistor.

7. A bistable triggered circuit as defined in claim 5 wherein said second impedance element is a resistor.

8. A monostable triggered circuit comprising a current multiplication transistor including a semi-conducting body, a base electrode, an emitter electrode and a collector electrode in contact with said body, an external network interconnecting said electrodes with a common junction point and including a first resistor connected between said base electrode and said junction point, an output impedance element connected between said collector electrode and said junction point, a source of voltage connected in series with said resistor and said impedance element and poled to apply a voltage in the reverse direction between said collector and base electrodes, a capacitor connected between said emitter electrode and said junction point, a source of trigger pulses coupled across said first resistor, said circuit having a stable state of low current conduction and an instable state of high current conduction, and means including a second resistor connected to said emitter electrode for applying to said emitter electrode during said stable state of conduction a voltage to bias said emitter electrode in the reverse direction with respect to said base electrode.

9. A monostable triggered circuit comprising a current-multiplication transistor including a semi-conducting body, a base electrode, an emitter electrode and a collector electrode in contact with said body, an external network interconnecting said electrodes with a common junction point and including a first resistor connected between said base electrode and said junction point, an output impedance element connected between said collector electrode and said junction point, a source of voltage connected in series with said first resistor and said impedance element and poled to apply a voltage in the reverse direction between said collector and base electrodes, a capacitor connected between said emitter electrode and said junction point, said circuit having a stable state of low current conduction and an instable state of high current conduction, a source of trigger pulses coupled across said first resistor, and a second resistor connected across said capacitor for biasing said emitter electrode in the reverse direction with respect to said base electrode during said stable state of conduction.

10. A relaxation oscillator comprising a semiconductor device having a semiconducting body, a base electrode, an emitter electrode and a collector electrode in contact with said body, means for applying a reverse bias voltage between said collector and base electrodes, a source of voltage, a resistor connected serially between said source and said emitter electrode said source being so poled and connected to as to apply normally a forward bias voltage between said emitter and base electrodes, an impedance element connected to said base electrode, the free terminals of said impedance element and of said source being connected together, and a capacitor connected between said emitter electrode and a point of fixed potential, whereby a saw-tooth wave may be derived from said emitter electrode and pulses of negative polarity from said base electrode.

11. A relaxation oscillator comprising a semiconductor device having a semiconducting body, a base electrode, an emitter electrode and a collector electrode in contact with said body, means for applying a reverse bias voltage between said collector and base electrodes, a first impedance element connected to said collector electrode, a source of voltage, a resistor connected serially between said source and said emitter electrode said source being so poled and connected as to apply normally a forward bias voltage between said emitter and base electrodes, a second impedance element connected to said base electrode, the free terminals of said second impedance element and of said source being connected together, and a capacitor connected between said emitter electrode and a fixed potential point, whereby a saw-tooth wave may be derived from said emitter electrode, a pulses of negative polarity from said base electrode, and pulses of positive polarity from said collector electrode.

12. A triggered relaxation oscillator comprising a semiconductor device having a semiconducting body, a base electrode, an emitter electrode and a collector electrode in contact with said body, means for applying a reverse bias voltage between said collector and base electrodes, a first impedance element connected to said collector electrode, a source of voltage, a resistor connected serially between said source and said emitter electrode, said source being so poled and connected as to apply normally a forward bias voltage between said emitter and base electrodes, a second impedance element connected to said base electrode, the free terminals of said second impedance element and of said source being connected together, a capacitor connected between said emitter electrode and a fixed potential point, and means for impressing trigger pulses on one of said electrodes.

13. An oscillator as defined in claim 12 in which said trigger pulses are of positive polarity and are impressed on said emitter electrode.

14. An oscillator as defined in claim 12 in which said trigger pulses are of negative polarity and are impressed on said base electrode.

References Cited in the file of this patent

UNITED STATES PATENTS

| | | |
|---|---|---|
| 2,524,035 | Bardeen et al. | Oct. 3, 1950 |
| 2,533,001 | Eberhard | Dec. 5, 1950 |

OTHER REFERENCES

Reich et al.: The Review of Scientific Instruments, August 1949, article entitled, "A Transistor Trigger Circuit," pages 586–588.